(12) United States Patent
LeMay (10) Patent No.: US 8,816,186 B2
(45) Date of Patent: Aug. 26, 2014

(54) PRE-FABRICATED NON PENETRATING PHOTOVOLTAIC-SUPPORT MECHANISM

(76) Inventor: John Christopher LeMay, Sparks, NV (US)

( * ) Notice: Subject to any disclaimer, the term of this patent is extended or adjusted under 35 U.S.C. 154(b) by 79 days.

(21) Appl. No.: 13/066,011

(22) Filed: Apr. 4, 2011

(65) Prior Publication Data

US 2011/0247675 A1 Oct. 13, 2011

Related U.S. Application Data

(60) Provisional application No. 61/342,170, filed on Apr. 9, 2010.

(51) Int. Cl.
| | | |
|---|---|---|
| *F24J 2/52* | (2006.01) | |
| *H01L 31/042* | (2014.01) | |
| *F24J 2/46* | (2006.01) | |
| *F24J 2/40* | (2006.01) | |

(52) U.S. Cl.
CPC ............. *H01L 31/0422* (2013.01); *Y02E 10/50* (2013.01); *F24J 2/5239* (2013.01); *F24J 2/4638* (2013.01); *Y02B 10/12* (2013.01); *F24J 2/405* (2013.01); *Y02E 10/47* (2013.01)
USPC ........................................................ 136/244

(58) Field of Classification Search
CPC ......... F24J 2/405; F24J 2/4638; F24J 2/5239; H01L 31/0422; Y02E 10/47; Y02E 10/50; Y02B 10/12
USPC ........................................................ 136/244
See application file for complete search history.

(56) References Cited

U.S. PATENT DOCUMENTS

| | | | | |
|---|---|---|---|---|
| 5,125,608 | A | * 6/1992 | McMaster et al. | 248/163.1 |
| 2005/0217665 | A1 | * 10/2005 | Luconi | 126/696 |
| 2007/0144575 | A1 | * 6/2007 | Mascolo et al. | 136/246 |
| 2008/0053517 | A1 | * 3/2008 | Plaisted et al. | 136/251 |
| 2008/0245404 | A1 | * 10/2008 | DeLiddo | 136/251 |
| 2010/0000516 | A1 | * 1/2010 | Conger | 126/569 |

OTHER PUBLICATIONS

Wall-Definition, "Definition of wall", Merriam-Webster, [online], [retrieved on Jan. 6, 2014]. Retrieved from the Internet:<URL: http://www.merriam-webster.com/dictionary/wall>, pp. 1-4.*

\* cited by examiner

*Primary Examiner* — Jeffrey T Barton
*Assistant Examiner* — Tae-Sik Kang (57) ABSTRACT

A solar energy collection system comprised of non-penetrating structural components wherein the solar collectors including the structure are restrained from movement by wind energy redirection, and an interlocking cable restraint system.

7 Claims, 7 Drawing Sheets

PRE-FABRICATED NON PENETRATING PHOTOVOLTAIC-SUPPORT MECHANISM

CROSS REFERENCE TO RELATED APPLICATIONS

This application claims the benefit of priority to Provisional U.S. Patent Application No. 61/342,170 filed Apr. 9, 2010, and entitled PRE-FABRICATED NON PENETRATING PHOTOVOLTAIC SUPPORT MECHANISM.

STATEMENT REGARDING FEDERALLY SPONSORED RESEARCH OR DEVELOPMENT

There has been no federally sponsored research on this project.

REFERENCE TO SEQUENCE LISTING, A TABLE, OR A COMPUTER PROGRAM LISTING COMPACT DISC APPENDIX

Not Applicable

FIELD OF THE INVENTION

This invention relates to a mechanism for manufacturing, shipping, constructing, securing, and controlling roof or structure mounted photovoltaic modules.

1. Background of the Invention

Racking systems for photovoltaic modules are used for all types of installations from ground mount systems to rooftop systems. There are three basic categories of methods used to support photo voltaic modules.
1. Anchoring: Stationary racks that are connected directly to the structural members of the building that they are mounted on. These racks fall into different sub-categories.
   a. Racks that support the modules at a predetermined angle away from the roof surface and toward the sun connecting directly to the roof structural members.
   b. Racks that connect directly to the roof structure running parallel to the roof surface.
2. Ballasted: Racks that do not connect to the roof structure and are held in place by weighted objects that attempt to counteract the effects of wind. This method requires large amounts of weight to be added to a roof structure. To support the additional weight the roof must be engineered and then sometimes modified so as to support the additional weight. This type of system is prone to movement when exposed wind gusts.
3. Hold-downs: Racks that are held down using mechanical hold-down mechanisms which are connected directly to the structural members of the roof. This method requires that the waterproof roof membrane must be removed to install the hold-down and then replaced. The racking is then connected to the hold-down by a cable connection.
4. The known prior art (Photovoltaic Racking Systems), cannot be assembled on shipping pallets without dead air space between the components. This causes additional costs to be incurred when shipping the racking.
5. Continuous electrical continuity is required between all conductive (metal) components of the system. This includes the photovoltaic panels and all racking components.
6. Lightning protection is commonly required to protect the system components and building structure. A method of connecting the photovoltaic panels and racking is required to connect the components to a lightning protection system.
7. Accordingly there is a need for a system that can be mass manufactured, shipped in an economical method and secured to structures in a method that will not violate the waterproof roof membrane and will not create undue burden on the roof structure by adding weighted ballast.
8. The industry standard at this time is for photovoltaic panels to be installed one unit at a time. This is inefficient and creates economic disadvantages.

2. Brief Summary of the Invention

It is an object of the present invention to provide a method of securing and supporting photovoltaic panels, on a roof or other structure, without employing roof penetrations. The present invention does not use weighted structures (ballasted structures) to hold the photovoltaic panels down on the roof. The object provided can be manufactured at a remote plant and then shipped using standard methods without dead air space between the components.

The invention provided contains a unique method of securing the racking, providing electrical continuity between all metal components and providing a unique method of connecting to lightning protection.

The object of invention provides a unique mechanism that uses wind energy to offset wind energy.

The object of invention uses wind energy to restrain the racking system.

Description of Figures

The object of invention provides a unique method of securing photovoltaic panels of all types and sizes in groups of three to eighteen or more.

This method of securing provides a unique method of mass producing racked panels for efficient economical installation.

DETAILED DESCRIPTION OF THE INVENTION

Figure 1:
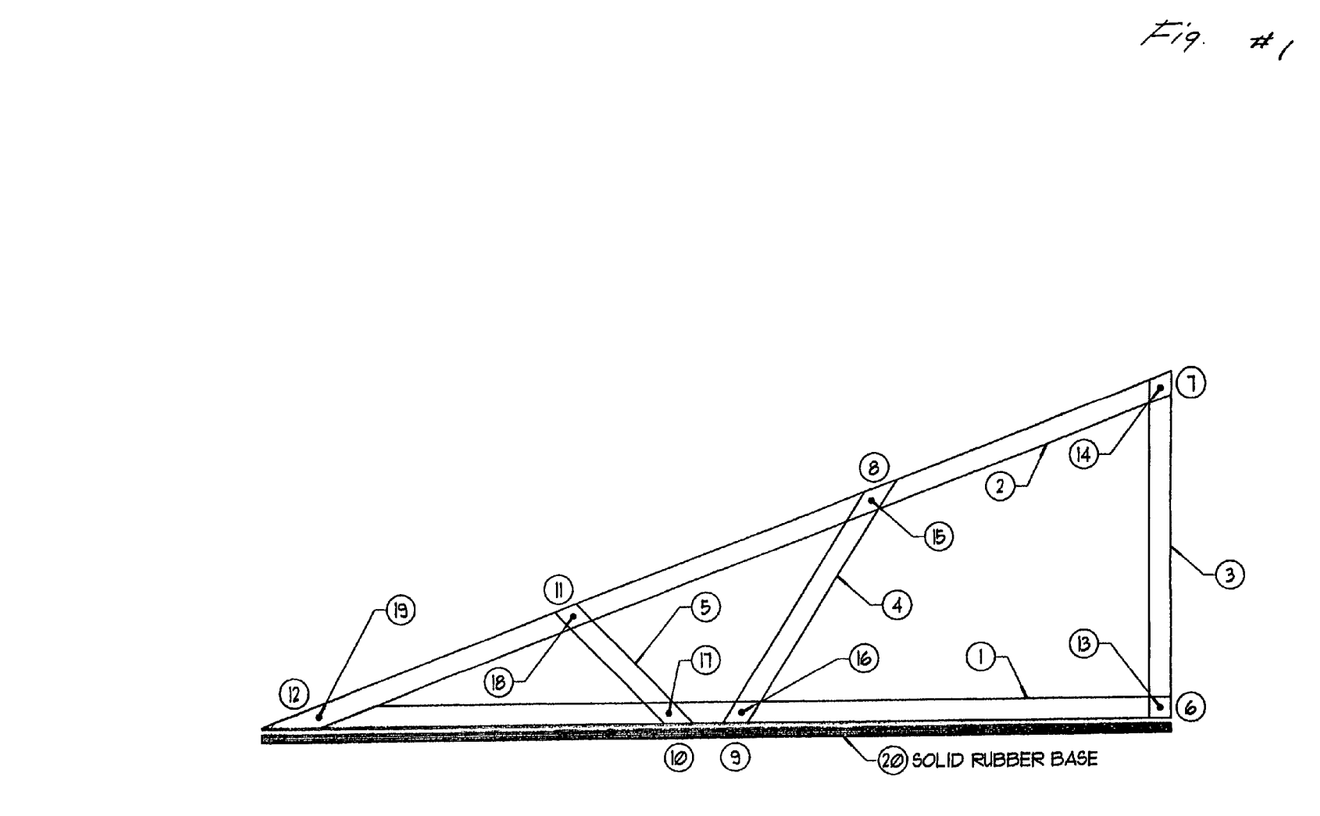
FIG. 1. Side view Support Structure in accordance with complete invention.

Referring to FIG. 1.

FIG. 1. is a side view of the support structure.

Component 1. is a rectangular tube which creates the base plate which accepts the weight of the components mounted on the support structure.

Component 2 is a rectangular tube which makes up the top plate which provides vertical support for components to be installed on the support structure.

Figure 6:
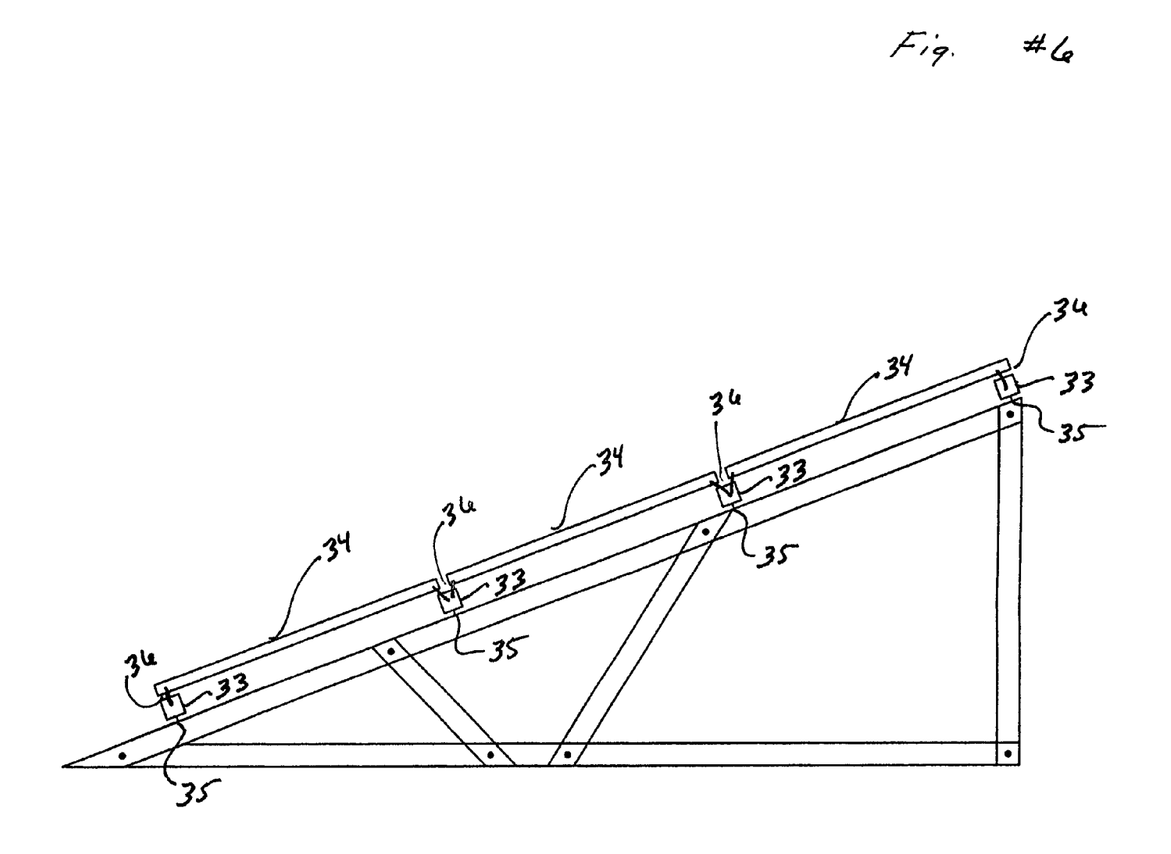
FIG. 6. Side view of the photovoltaic assembly.

Component 3 is a rectangular tube which provides vertical support and transmits a portion of the weight of component 2 and components 33, 34, 35 and 36 (shown on DWG #6) that are mounted onto component 2.

Components 4 and 5 are rectangular tubes cut to angle and fit for insert into cutouts 9 and 10 of component 1, 8 and 11 of component 2.

Components 4 and 5 are rectangular tubes cut to angle and fit for insert Into cutouts 9 and 10 of component 1, 8 and 11 of component 2. Components 4 and 5. are included for the even distribution of weight loads impressed on component 2. They may be added as needed.

Description of FIG. 1

Components No. 6, 7, 8, 9, 10, 11 and 12 are factory cutouts, cutouts are accomplished using a plasma cutter removing the top portion of the rectangular metal tube.

The cutouts create a void which the bottom and top ends of components 3, 4, and 5 can slip into and be secured by a stainless steel nut and bolt at the time of assembly at the final installation location.

Components 13, 14, 15, 16, 17, 18 and 19 are stainless steel nut/washer and bolt assemblies used to secure and contain all components.

Component 20 is a UV protected malleable rubber base. Component 20 is attached to component 1 using an epoxy adhesive. Component 20 is precut and factory installed.

All surfaces of each component of the support structure after manufacture are flat. All components may be stacked, one on top of the other without dead air space between the components.

All components can be shipped to outside sites using the most economical method available.

According to the invention there is provided a plurality of support structures depicted in FIG. 1.

Figure 2:
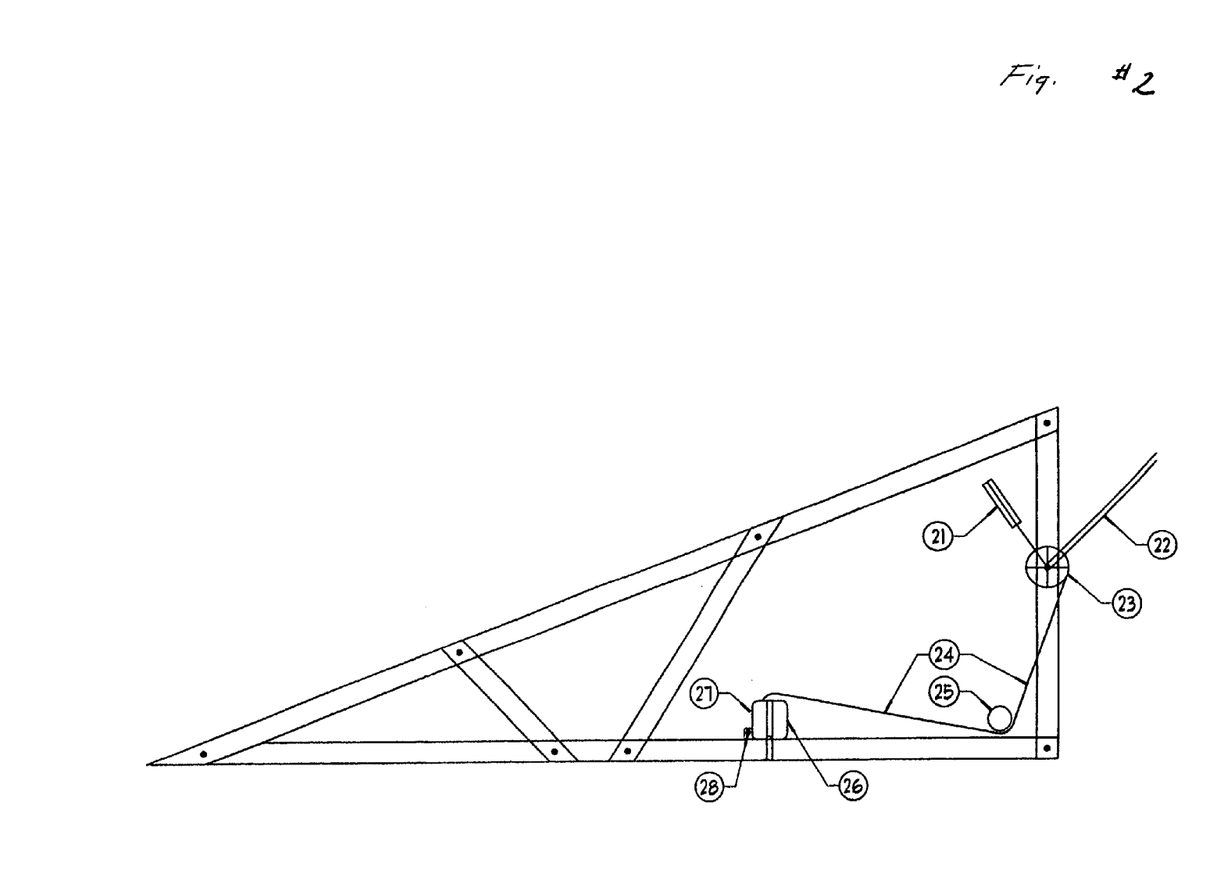
FIG. 2. Side view of the cable tension component in accordance with complete invention.
Figure 3:
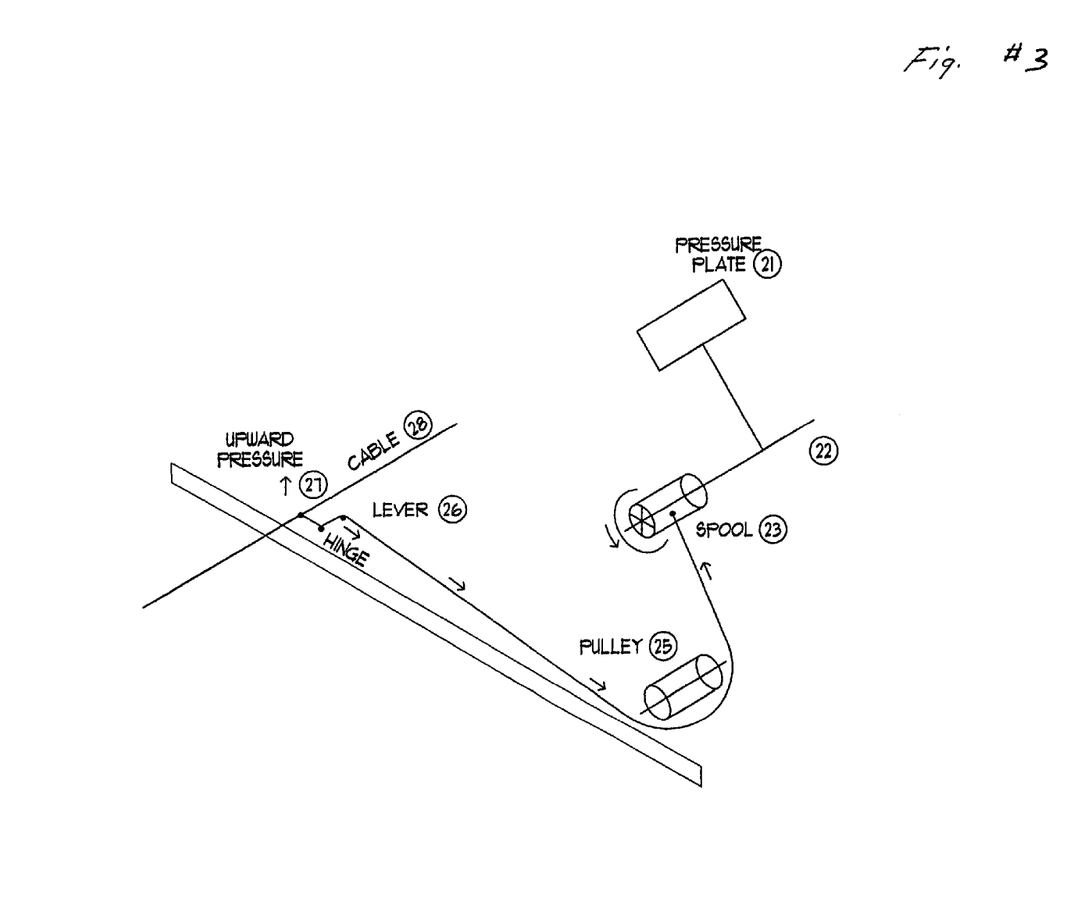
FIG. 3. Schematic view of the cable tension assembly in accordance with complete invention.

Referring to FIGS. 2 and 3

Figure shows a side view of components 21 thru 28.

Component 21 shows a side view of the wind pressure plate.

Component 22 shows the torque tube which the pressure plate 21 is attached to.

Component 23 shows the cable spool which is connected to and rotated by component 22.

Component 24 is the stainless steel tensioning cable that is attached to component 23, fed around component 25 and then connected component 26.

Component 25 is a pulley mounted on component 1.

Component 26 is Lever Assembly that employs leverage to increase the lifting force of the wind pressure plate component 21.

Component 27 is a vertical containment device that guides and contains component 28 vertically thereby limiting horizontal movement of component 28.

Component 28 is a stainless steel cable that runs over the top of component 1.

Component 28 can be configured and connected in a grid pattern that limits horizontal movement of component 1.

Component 28 acts as a grounding conductor creating continuity of all connected metal surfaces to the grounding electrode conductor. Component 28 is designed to connect to lightning protection systems thereby providing lightning protection to all metal components of the photovoltaic panels and support structure.

Figure 4:
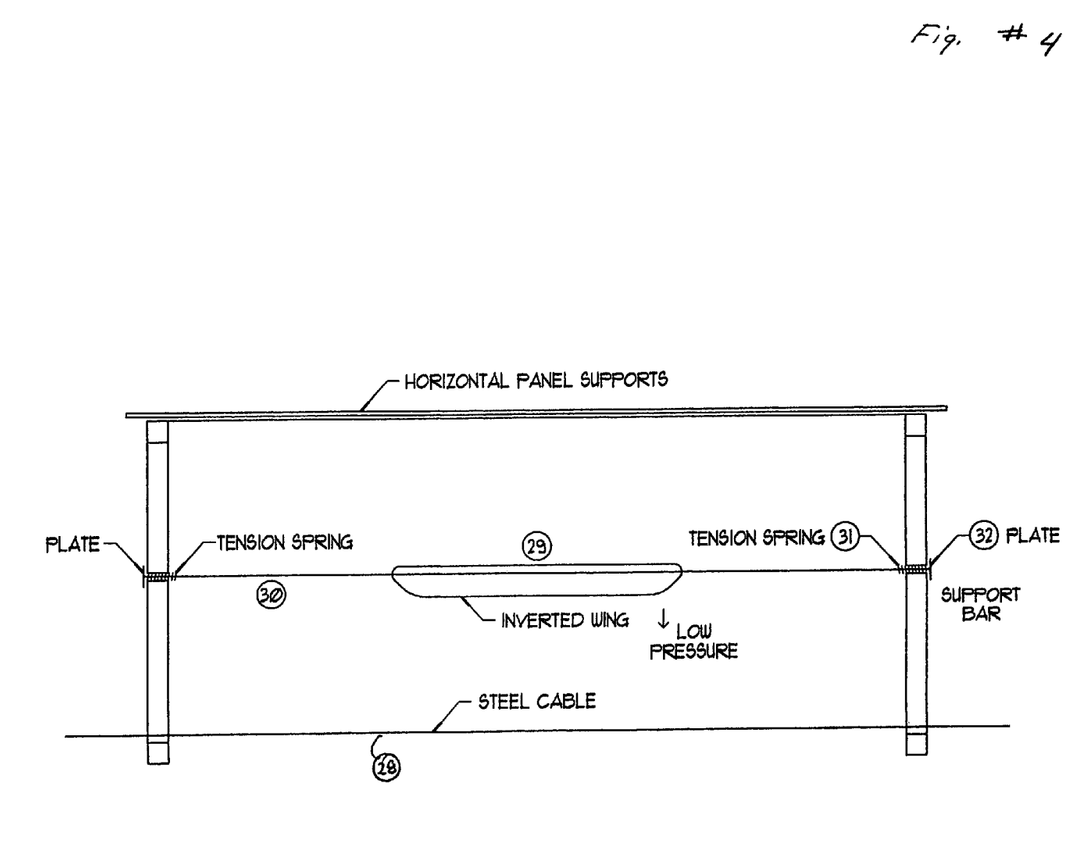
FIG. 4. Rear view of the inverted wing assembly in accordance with complete invention.
Figure 5:
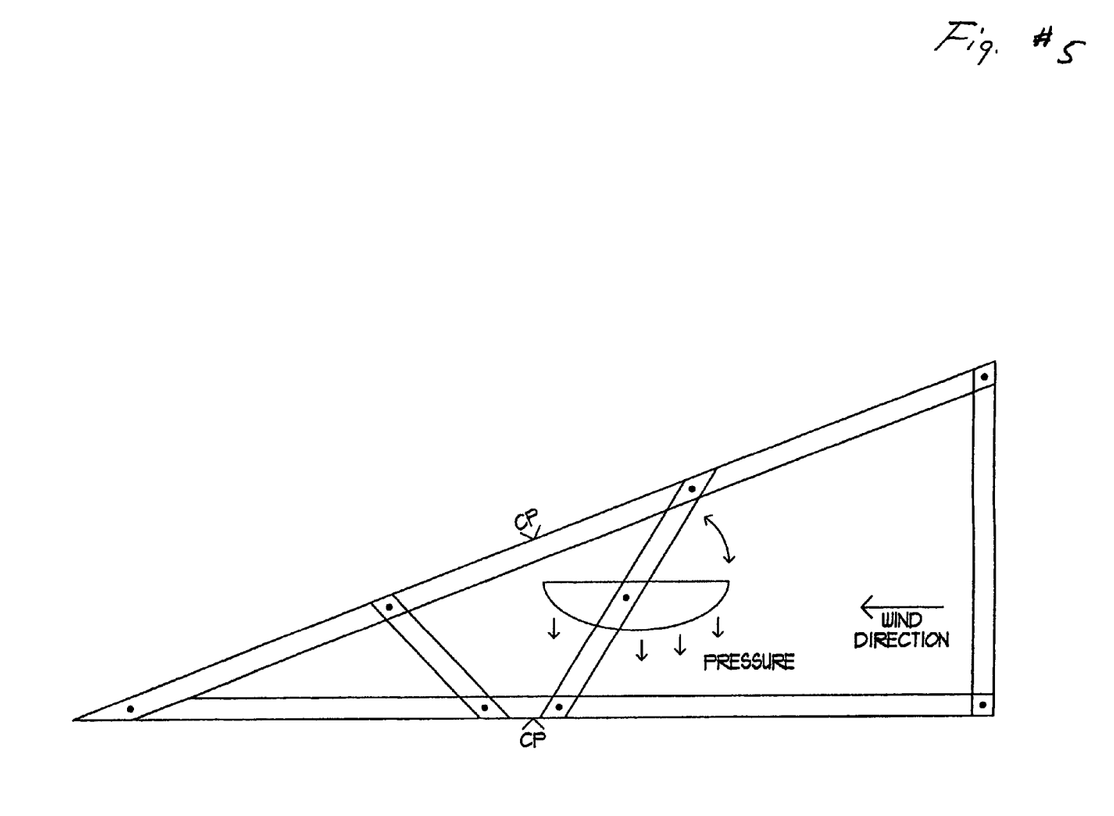
FIG. 5. Side view of the inverted wing component in accordance.

Referring to FIGS. 4 and 5

Component 28 is shown installed between support structures.

Component 29 shows an inverted wing. The function of the wing is to use air pressure (air pressure is lower on the elongated bottom surface of the wing than on the flat straight upper portion of the wing) to create a downward pressure on the wing.

The effect of the wing then neutralizes the upward pressure on the bottom of the photovoltaic panels.

The wing component 29 can be manufactured from plastic or metal components.

Component 3 is a torsion bar which transmits the downward energy forces from the inverted wing to the vertical supports component 3.

Component 31 is a tension and or torsion spring which acts to limit and contain the movement of the torsion bar component 30.

Component 32 is a mounting plate which attaches structurally to component 3 and connects mechanically to the tension spring component 31.

Referring to FIG. 6

Components 21, 22, 23 and 24 are horizontal support members which occur in plurality.

Components 21, 22, 23 and 24 are attached to component 2. Support Structures appear in plurality and components 21, 22, 23, and 24 are mounted, connected and supported by the complete Support Structure as detailed in drawings 1, 2, 3, 4 and 5. There are required a minimum of two Support Structures to complete one invention. Components 33 are placed into jig type racking assembly, and then pre-drilled at the appropriate locations for the placement anchor bolts component 35. Component 33 is predrilled for the acceptance of bolts component 36. Component 34 with preinstalled bolts component 36 is then attached to component 33. When components are connected a rigid planar surface is created. The rigid planar surface is then transported to the site of final destination and installed and connected component 2 of the support structure.

Figure 7:
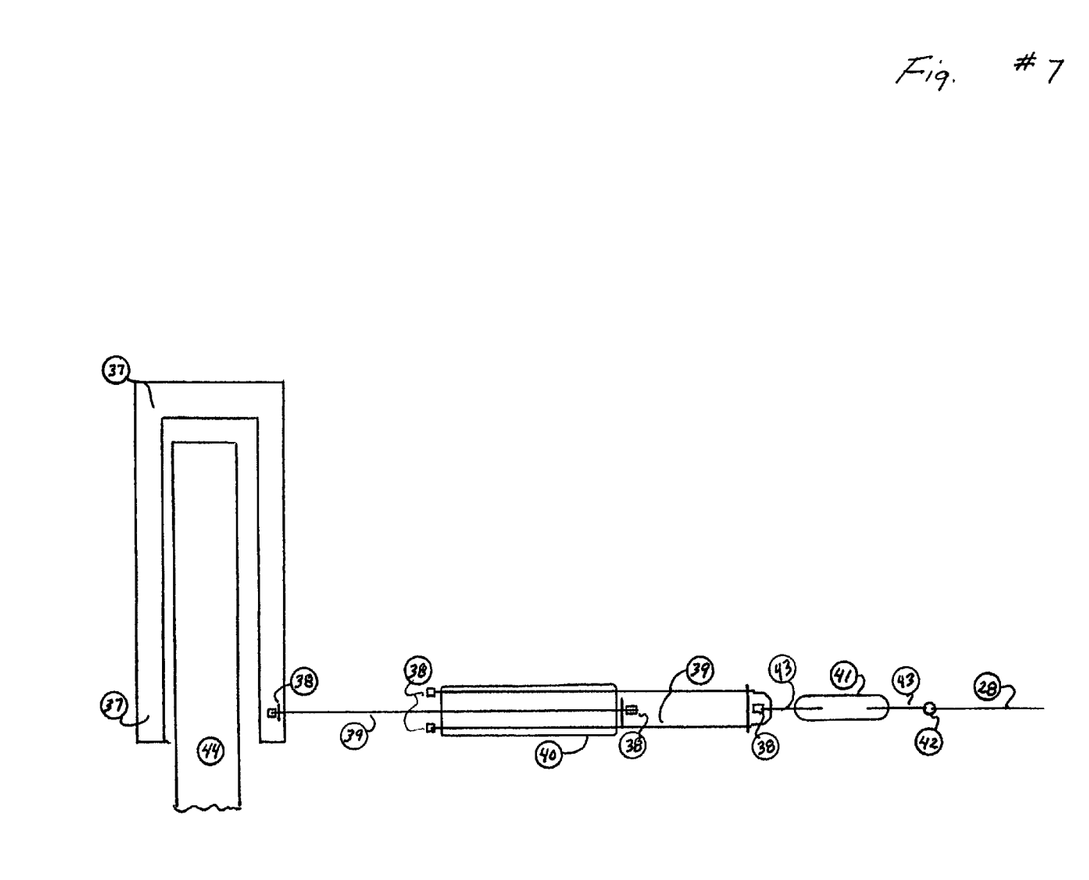
FIG. 7. Side view of the non-penetrating cable restraint anchor/tensioning mechanism.

Referring to FIG. 7

Component 28 shows the restraining cable that is depicted on FIGS. 2-3 and 4.

Component 42 is a connecting mechanism which couples the restraining cable (component 28) to component 43.

Component 43 is a threaded rod approximately 12" in length which connects to the threaded end of component 41.

Component 41 is an assembly approximately 12" in length constructed of cast iron with an open center, which allows for threaded rod to move within the center. The ends of the assembly are threaded, the threaded rod (component 43) is screwed into each end of component 41 when component 41 is rotated.

Component 38 is a nut and washer assembly which occurs in plurality.

Component 40 is a spring assembly which is anchored to component 37 by means of a threaded rods (component 39) which secures one end of the spring to component 37 and the other end of the spring to component 43. This allows for tension to be impressed on component 40 which then transfers and maintains tension on component 28.

Component 37 is a structural steel assembly constructed so as to fit over the existing structural wall of a building or ground mounted concrete, steel or wood structure.

INDEX OF INDIVIDUAL COMPONENTS

Drawing #1
Components
1. Base Plate of Supporting Structure.
2. Top Plate of Support Structure.
3. Vertical end support post.
4. Angled support post.
5. Angled support post.
6. Cutout in top of 1. for insertion of lower end of 3.
7. Cutout on bottom of 2. for insertion of upper end of 3.

8. Cutout of bottom of 2. for insertion of upper end of 4.
9. Cutout of top of 1. for insertion of lower end of 4.
10. Cutout of top of 1. for insertion of lower end of 5.
11. Cutout of bottom of 2. for insertion of upper end of 5.
12. Angled cutout of end of 1. for connection and insertion of lower end of 2.
13. Stainless Steel Bolt, washers, lock-washer and nut assembly.
14. Stainless Steel Bolt, washers, lock-washer and nut assembly.
15. Stainless Steel Bolt, washers, lock-washer and nut assembly.
16. Stainless Steel Bolt, washers, lock-washer and nut assembly.
17. Stainless Steel Bolt, washers, lock-washer and nut assembly.
18. Stainless Steel Bolt, washers, lock-washer and nut assembly.
19. Stainless Steel Bolt, washers, lock-washer and nut assembly.
20. Solid rubber base to isolate and insolate Support Structure from roof membrane. May be constructed from molded rubber particles.
Drawing #2 and #3
Components
21. Wind pressure plate.
22. Torsion rod that is activated by 21.
23. Cable Spool that is rotated by 22.
24. Stainless Steel cable.

Index of Individual Components

25. Pulley used to contain and direct 24.
26. Lever assembly used to force upward pressure on 28
27. Containment device used to contain horizontal movement of cable when cable is lifted upward by 26.
28. Stainless Steel Hold-down Cable
Drawing #4 and #5
Components
29. Inverted Wing, as wind flows over wing low pressure area is created on bottom side of wing. This causes a downward force on the wing.
30. Support and torsion bar for wing. This bar transmits downward pressure of wing to Vertical End Support Posts 3.
31. Torsion spring used to maintain Inverted Wing 29. in a horizontal position while at the same time allowing for a small amount of flexibility. Torsion spring is connected to 30.
32. Connection and support plate for 31.
Drawing #6
Components
33. Horizontal support and framing member for photovoltaic panel assembly.
34. Photovoltaic panels.
35. Stainless Steel bolt, washer, lock-washer and nut assembly. This connection is made at the assembly location.
36. Stainless Steel bolt, washer, lock-washer and nut assembly. This connection is made at the time photovoltaic panels are assembled on 33. in groups of three or more and as many as nine per assembly. Photovoltaic racked panels can be manufactured at the manufacturing facility prior to shipping or at a remote staging fabricating facility.
Drawing #7
37. A structural steel or aluminum assembly that fits over an existing concrete, steel or wood structural component.

Index of Individual Components

38. A nut and washer assembly.
39. A rod assembly that is threaded at both ends.
40. Spring
41. A tumbuckle type assembly which draws two threaded rods closer together.
42. A mechanism that couples a threaded rod and a cable end.
43. Threaded rod.
44. Shown to depict an existing structure only.

What is claimed is:
1. A photovoltaic support mechanism comprising:
a top plate,
a base plate,
a plurality of support posts connected to the top plate and the base plate,
a torsion bar connected to two support posts of the plurality of support posts by two tension springs for limiting and containing a movement of the torsion bar,
an inverted wing supported by the torsion bar, wherein the inverted wing comprises an elongated bottom surface and a flat straight upper portion to use air pressure to create a downward pressure thereon,
a first steel cable,
a second steel cable,
a cable spool mounted on one support post of the plurality of support post, and
a wind pressure plate connected to the cable spool, wherein the wind pressure plate is configured to apply torque to the cable spool to apply tension to the first steel cable that is applied to the second steel cable to limit horizontal movement of the base plate.
2. The photovoltaic support mechanism according to claim 1, further comprising at least one photovoltaic panel.
3. The photovoltaic support mechanism according to claim 2, wherein the second steel cable is connected to a lightening protection system providing lightening protection to the photovoltaic panel and the photovoltaic support mechanism.
4. The photovoltaic support mechanism according to claim 1, wherein the inverted wing is manufactured from plastic or metal.
5. The photovoltaic support mechanism according to claim 1, further comprising a solid rubber base under the base plate.
6. The photovoltaic support mechanism according to claim 1, further comprising an assembly connecting the second steel cable to a building or ground mounted concrete, steel or wood structure.
7. A solar energy collector comprising a plurality of the photovoltaic support mechanism according to claim 1.

* * * * *